United States Patent
Marupaduga et al.

(10) Patent No.: US 11,901,978 B1
(45) Date of Patent: Feb. 13, 2024

(54) PERFORMING MULTI-USER MULTIPLE-INPUT-MULTIPLE-OUTPUT (MU-MIMO) IN WIRELESS NETWORKS

(71) Applicant: Sprint Spectrum LP, Overland Park, KS (US)

(72) Inventors: Sreekar Marupaduga, Overland Park, KS (US); Rajveen Narendran, Olathe, KS (US)

(73) Assignee: Sprint Spectrum LP, Overland Park, KS (US)

( * ) Notice: Subject to any disclaimer, the term of this patent is extended or adjusted under 35 U.S.C. 154(b) by 0 days.

(21) Appl. No.: 16/402,554

(22) Filed: May 3, 2019

(51) Int. Cl.
*H04W 72/04* (2023.01)
*H04B 7/0452* (2017.01)
*H04W 24/08* (2009.01)
*H04B 17/26* (2015.01)
*H04B 17/336* (2015.01)
*H04W 24/10* (2009.01)

(52) U.S. Cl.
CPC ........... *H04B 7/0452* (2013.01); *H04B 17/26* (2015.01); *H04B 17/336* (2015.01); *H04W 24/08* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 8,644,422 B2 | 2/2014 | Gao et al. | |
| 9,203,552 B2 | 12/2015 | Geirhofer et al. | |
| 9,698,889 B2 | 7/2017 | Xue et al. | |
| 2018/0176743 A1* | 6/2018 | Elsherif | H04W 4/06 |
| 2018/0234141 A1* | 8/2018 | Silverman | H04L 43/0894 |

* cited by examiner

*Primary Examiner* — Willie J Daniel, Jr.
(74) *Attorney, Agent, or Firm* — Jones Robb, PLLC (57) ABSTRACT

Allocating resources in a wireless network utilizing SU-MIMO and MU-MIMO modes of operation includes determining an increase in a resource usage of MU-MIMO wireless devices and responsive to the determining, reducing an allocation of resources for one or more SU-MIMO wireless devices. These operations may be performed based on determining that a load level associated with a serving access node rises to meet a threshold.

17 Claims, 8 Drawing Sheets

PERFORMING MULTI-USER MULTIPLE-INPUT-MULTIPLE-OUTPUT (MU-MIMO) IN WIRELESS NETWORKS

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless networks may be configured to utilize a multi-user (MU-MIMO) mode, in which multiple data streams can be directed towards a plurality of wireless devices that are selected to participate in the MU-MIMO operating mode based on the orthogonality of transmission, thereby maximizing resources. MIMO has been identified as one of the promising air interface technologies to address the capacity requirement required demanded by 5G networks. However, indiscriminately activating a MU-MIMO transmission mode for increasing numbers of devices can cause a reduction in aggregate throughput or a loss of MU-MIMO gains, particularly as these increased numbers of wireless devices suffer from poor signal conditions. In other words, there is a need for balancing the number of wireless devices utilizing MU-MIMO, such that the gains from the MU-MIMO mode of operation can be realized.

OVERVIEW

Exemplary embodiments described herein include methods, systems, and processing nodes for performing MU-MIMO in a wireless network. An exemplary method for performing MU-MIMO in a wireless network includes monitoring one or more transmission characteristics associated with the wireless network, and adjusting a maximum number of wireless devices participating in MU-MIMO based on the one or more signal conditions. Adjusting the maximum number of wireless devices participating in MU-MIMO may include one or more of adjusting a maximum average number of wireless devices per MU-MIMO group, or a maximum number of MU-MIMO groups within the wireless network.

An exemplary system for performing MU-MIMO in a wireless network includes a processing node, and a processor coupled to the processing node. The processor can be configured to perform operations including monitoring one or more transmission characteristics associated with a sector in the wireless network, and adjusting a maximum number of wireless devices participating in MU-MIMO based on the one or more signal conditions. The maximum number of wireless devices participating in MU-MIMO can include a maximum average number of wireless devices per MU-MIMO group, a maximum number of MU-MIMO groups, a maximum number of MU-MIMO wireless devices attached to the access node, an average number of MU-MIMO wireless devices per MU-MIMO group, and various combinations of these numbers.

An exemplary processing node for performing MU-MIMO in a wireless network configured to perform operations including determining a historical trend of MU-MIMO gains within a sector of the wireless network, measuring one or more signal characteristics of MU-MIMO signals within the wireless network and, based on a combination of the historical trend and the one or more signal characteristics, adjusting a maximum number of wireless devices located in the sector and eligible to participate in MU-MIMO.

DETAILED DESCRIPTION

In embodiments disclosed herein, a method for performing MU-MIMO in a wireless network, including monitoring one or more transmission characteristics associated with the wireless network, and adjusting a maximum number of wireless devices participating in MU-MIMO based on the one or more signal conditions. Adjusting the maximum number of wireless devices participating in MU-MIMO may include one or more of adjusting a maximum average number of wireless devices per MU-MIMO group, or a maximum number of MU-MIMO groups within the wireless network. In an exemplary embodiment, the one or more transmission characteristics comprise signal characteristics of MU-MIMO signals within a sector of an access node in the wireless network. For example, the signal characteristics of the MU-MIMO signals comprise one or more of an average signal separation, a size of the sector, an orthogonality of MU-MIMO eligible wireless devices located in the sector, an angle of arrival of the MU-MIMO eligible wireless devices located in the sector, and a throughput of the MU-MIMO signals. The aggregate throughput may include a throughput of each of the one or more MU-MIMO groups in the sector, an average throughput of each MU-MIMO group or each wireless device in each MU-MIMO group, or an aggregate throughput (i.e. total throughput) of all MU-MIMO signals within the sector. Thus, in an exemplary embodiment, a maximum number of wireless devices eligible to participate in MU-MIMO, or a maximum number of MU-MIMO groups, is increased or decreased depending on whether or not the signal characteristics meet one or more thresholds.

Further, the method includes determining a pairing efficiency metric of the sector based on the signal characteristics, and adjusting the maximum number of wireless devices participating in MU-MIMO such that the pairing efficiency metric is optimized. In an exemplary embodiment, the pairing efficiency metric is based on whether maximum or optimal values of each signal characteristic are achieved. For example, the pairing efficiency metric may increase if the throughput increases, and if many wireless devices within the sector meet an orthogonality threshold. Further, a number of successful pairings may be considered in determining the pairing efficiency metric. The pairing efficiency metric may further be based on historical trends of the signal characteristics. For example, the historical trends may be monitored and recorded at time intervals, and the pairing efficiency metric based on the recorded historical trends. Thus, at certain time intervals, the pairing efficiency metric is monitored when adjusting the maximum number of MU-MIMO wireless devices.

In exemplary embodiments described herein, the one or more transmission characteristics can include noise levels associated with one or more existing MU-MIMO groups in the sector. In these embodiments, the method includes determining that the noise levels exceed a threshold, and reducing the maximum number of wireless devices participating in MU-MIMO in the sector. For example, as MU-MIMO pairings (or groups) increase, a signal to interference plus noise ratio (SINR) may be reduced. Thus, when a SINR is measured at below a threshold, a maximum number of MU-MIMO groups may be reduced. The SINR may be based on measurements at specific locations within a sector, and locations having a historical trend of a low SINR may be monitored and MU-MIMO group maximum limits applied therein. Alternatively or in addition, the noise levels may be based on a throughput of the sector or of MU-MIMO groups within the sector.

In another exemplary embodiment, the transmission characteristics can include a transmission bandwidth associated with the sector. In this embodiment, adjusting the maximum number of wireless devices participating in MU-MIMO comprises increasing the maximum number for a high transmission bandwidth and decreasing the maximum number for a low transmission bandwidth. For example, if the bandwidth is 10 MHz or 15 MHz, then decreasing the number of MU-MIMO wireless devices may improve MU-MIMO gains. Conversely, if the bandwidth is 20 MHz or higher, then the number of MU-MIMO wireless devices (or MU-MIMO groups) may be increased without causing any detriment to MU-MIMO gains within the sector.

In another exemplary embodiment, the transmission characteristics can include channel state information. The channel state information may be based on (or may indicate) external interference caused to wireless devices located within the sector from an external source, such as other sectors or other wireless networks utilizing similar frequencies. In these embodiments, adjusting the maximum number of wireless devices participating in MU-MIMO comprises reducing the maximum number if the external interference rises above a threshold. For example, an upper or lower band of a frequency spectrum, such as the top 35% and bottom 35% of frequencies, may be more likely to be affected by externally-induced interference. Thus, these portions of the spectrum may be monitored, and a number of MU-MIMO wireless devices or groups may be reduced if the interference in these portions rises to meet a threshold.

As further described herein, the method described above (and variants of said method) may be performed by components within a system configured for performing MU-MIMO. An exemplary system described herein comprises a processing node and a processor coupled to the processing node. For example, the processor can be configured to perform operations including monitoring one or more transmission characteristics associated with a sector in the wireless network, and adjusting a maximum number of wireless devices participating in MU-MIMO based on the one or more signal conditions. The maximum number of wireless devices participating in MU-MIMO can include a maximum average number of wireless devices per MU-MIMO group, a maximum number of MU-MIMO groups, a maximum number of MU-MIMO wireless devices attached to the access node, an average number of MU-MIMO wireless devices per MU-MIMO group, and various combinations of these numbers. In this exemplary embodiment, the one or more transmission characteristics can include any of a MU-MIMO gain associated with one or more MU-MIMO groups within the sector, a noise level associated with one or more wireless devices in the sector, a channel bandwidth used within the sector, or an external interference experienced by the wireless devices in the sector. The MU-MIMO gain can be based on, for example, an average signal separation, a size of the sector, an orthogonality of MU-MIMO eligible wireless devices located in the sector, an angle of arrival of the MU-MIMO eligible wireless devices located in the sector, an aggregate throughput of the MU-MIMO signals, or any combination of the above. The system can be further configured to perform operations including determining a historical trend of the one or more transmission characteristics, and adjusting the maximum number in real-time based on the historical trend.

In another exemplary embodiment, a processing node for performing MU-MIMO in a wireless network (in, for example, the system described above) can be configured to perform operations including determining a historical trend of MU-MIMO gains within a sector of the wireless network, measuring one or more signal characteristics of MU-MIMO signals within the wireless network and, based on a combination of the historical trend and the one or more signal characteristics, adjusting a maximum number of wireless devices located in the sector and eligible to participate in MU-MIMO. In this embodiment, the operations can further include increasing the maximum number upon determining that the historical trend indicates high MU-MIMO gains, and decreasing the maximum number upon determining that the historical trend indicates low MU-MIMO gains. Further, whether or not the signal characteristics reach optimal values can be a factor in determining when to increase or decrease the maximum number of MU-MIMO devices, as further described herein.

Further, the operations described herein may be performed within a time period. The time period can be configurable, in that it can be adjusted by an operator of the wireless network, or by an automated feedback mechanism. For example, time intervals may be defined by the operator as every transmission-time-interval (TTI), every 10 ms, every 1 s, etc. These and additional operations are further described with respect to the embodiments depicted in FIGS. 1-10 below.

Figure 1:
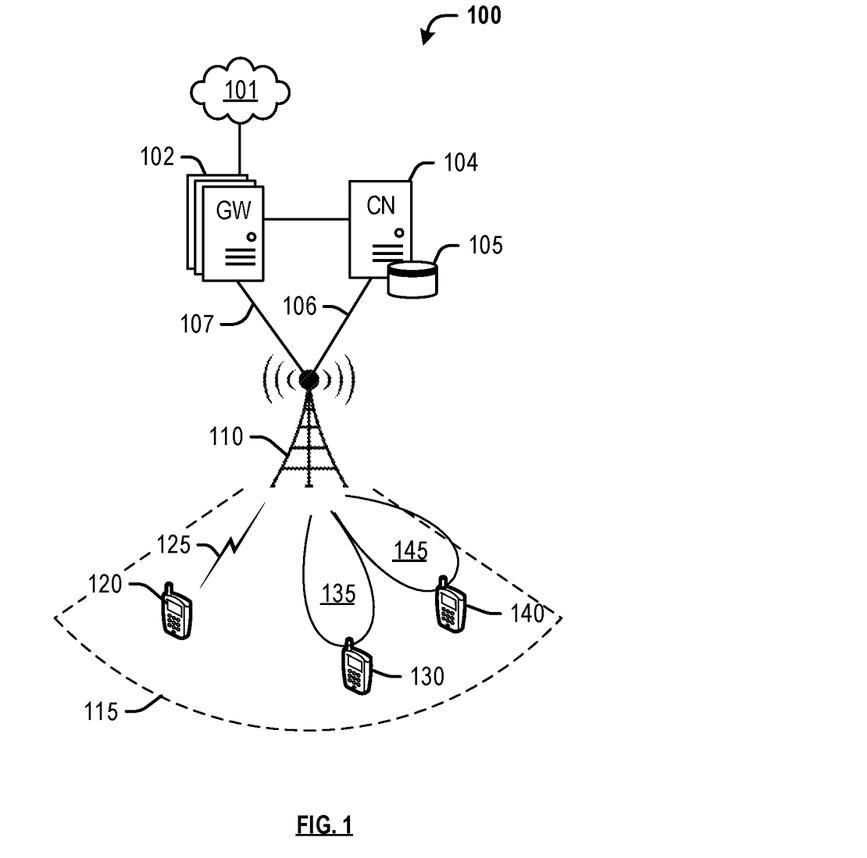
FIG. 1 depicts an exemplary system for performing MU-MIMO in a wireless network.

FIG. 1 depicts an exemplary system 100 for performing MU-MIMO in a wireless network. System 100 comprises a communication network 101, gateway node(s) 102, controller node 104, access node 110, and wireless devices 120, 130, 140. Access node 110 can be any network node configured to provide communication between end-user wireless devices 120, 130, 140 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB or a home eNodeB device. Moreover, it is noted that while access node 110 and wireless devices 120, 130, 140 are illustrated in FIG. 1, any number of access nodes and wireless devices can be implemented within system 100.

By virtue of comprising a plurality of antennae as further described herein, access node 110 can implement various transmission modes or operating modes within its coverage area, including multiple-input-multiple-output (MIMO), single user MIMO (SU-MIMO), multi-user MIMO (MU-MIMO), beamforming, etc. In an exemplary embodiment, access node 110 may deploy a first transmission channel 125 to wireless device 120, and a pair of formed beams 135 and 145 to wireless devices 130 and 140 respectively. For example, first transmission channel 125 may be deployed using a SU-MIMO operating mode, and formed beams 135, 145 may be deployed using an MU-MIMO operating mode. In other words, wireless devices 130 and 140 may be participating in a MU-MIMO group (or pairing). Wireless devices 130, 140 may qualify for MU-MIMO based on, for instance, an orthogonality of transmission, so as to maximize resources of a loaded access node. In other words, one or more criteria for pairing wireless devices for MU-MIMO (or including the wireless devices into an existing MU-MIMO group) include a channel orthogonality (i.e., non-overlapping and non-interfering channels) above a set threshold, which may be achieved by assigning cyclic shifts allocated to, for example, a Demodulation Reference Signal ("DM-RS") to differentiate parallel data streams, as well as having a SINR above a threshold. Qualifying wireless devices may have an assigned precoder that is orthogonal to other qualifying wireless devices. In an exemplary embodiment, downlink transmission schemes of access node 110 (and/or other access nodes not shown herein) may be supported at a physical layer by a set of downlink reference signals. These reference signals can be specific to wireless devices 120, 130, 140, i.e., DM-RS, or specific to geographical areas of access node 110 or sector 115, i.e., Common Reference Signals ("CRS"). DM-RS' are pre-coded signals used for demodulation purposes on scheduled PRBs. For example, a pre-coding module of access node 110 may apply pre-coding to data transmissions targeted to wireless devices 130, 140 based on channel feedback received from said wireless devices including RI, CQI, and PMI. CRS' are not pre-coded signals and are used by wireless devices 130, 140 for channel estimation. To fully exploit MU-MIMO mode, data/spatial streams intended to/from access node 110 and/or wireless devices 130, 140 need to be well separated and orthogonal at both Tx/Rx sides. Optimal pre-coding for MU-MIMO mode at, for example, a pre-coding module of access node 110, may include Dirty Paper Coding ("DPC") combined with user scheduling and power loading. Additional pre-coding techniques may include Channel Inversion ("CI"), e.g., to cancel interference, and/or Regularized Channel Inversion ("RCI"), e.g., to attenuate interference. To avoid scheduling wireless devices located at, for example, a cell-edge of access node 110, into MU-MIMO mode, a predicted SINR of both the primary and candidate wireless devices at the considered PRB are compared to the set threshold.

Further, access node 110 (or any other entity within system 100) may be configured to execute a method including monitoring one or more transmission characteristics associated with sector 115, and adjusting a maximum number of wireless devices participating in MU-MIMO based on the one or more signal conditions. Adjusting the maximum number of wireless devices participating in MU-MIMO may include one or more of adjusting a maximum average number of wireless devices per MU-MIMO group, or a maximum number of MU-MIMO groups within the wireless network. In an exemplary embodiment, the one or more transmission characteristics comprise signal characteristics of MU-MIMO signals 135, 145 within sector 115. For example, the signal characteristics of the MU-MIMO signals 135, 145 comprise one or more of an average signal separation (e.g. angular separation) between MU-MIMO signals 135, 145, a size of the sector 115, an orthogonality of MU-MIMO eligible wireless devices 130, 140, an angle of arrival (AoA) associated with each of the MU-MIMO eligible wireless devices 130, 140, and a throughput of the MU-MIMO signals 135, 145. The aggregate throughput may include a throughput of each of the one or more MU-MIMO groups in the sector 115 (e.g. the MU-MIMO group comprising wireless devices 130, 140), an average throughput of each MU-MIMO group or each wireless device in each MU-MIMO group, or an aggregate throughput (i.e. total throughput) of all MU-MIMO signals within the sector. Thus, in an exemplary embodiment, a maximum number of wireless devices eligible to participate in MU-MIMO, or a maximum number of MU-MIMO groups, is increased or decreased depending on whether or not the signal characteristics of MU-MIMO signals 135, 145 meet one or more thresholds.

Further, the method includes determining a pairing efficiency metric of the sector 115 based on the signal characteristics, and adjusting the maximum number of wireless devices participating in MU-MIMO such that the pairing efficiency metric is optimized. In an exemplary embodiment, the pairing efficiency metric is based on whether or not maximum or optimal values of each signal characteristic are achieved. For example, the pairing efficiency metric may increase if the throughput increases, and if many wireless devices within the sector meet an orthogonality threshold. For example, if wireless device 120 becomes eligible to participate in MU-MIMO along with wireless devices 130, 140, then the pairing efficiency metric of sector 115 can increase. Further, a number of successful pairings may be considered in determining the pairing efficiency metric. For example, if wireless device 120 joins the pairing or group of wireless devices 130, 140, and transmission 125 turns into a MU-MIMO transmission, then the pairing efficiency metric may increase. The pairing efficiency metric may further be based on historical trends of the signal characteristics and past MU-MIMO performance. For example, the historical trends may be monitored and recorded at time intervals, and the pairing efficiency metric based on the recorded historical trends. Thus, at certain time intervals, the pairing efficiency metric is monitored when adjusting the maximum number of MU-MIMO wireless devices.

In exemplary embodiments described herein, the one or more transmission characteristics of signals 135, 145 can include noise levels associated with one or more existing MU-MIMO groups in the sector 115. In these embodiments, the method includes determining that the noise levels exceed a threshold, and reducing the maximum number of wireless devices participating in MU-MIMO in the sector 115. For example, as MU-MIMO pairings (or groups) increase to include wireless device 120, a signal to interference plus noise ratio (SINR) experienced at each wireless device 120, 130, 140 may be reduced. Thus, when a SINR is measured at below a threshold, a maximum number of MU-MIMO groups may be reduced. The SINR may be based on measurements at specific locations within sector 115, and locations having a historical trend of a low SINR may be monitored and MU-MIMO group maximum limits applied therein. Alternatively or in addition, the noise levels may be based on a throughput of the sector or of MU-MIMO groups within the sector 115.

In another exemplary embodiment, the transmission characteristics can include a transmission bandwidth associated with the sector 115. In this embodiment, adjusting the maximum number of wireless devices participating in MU-MIMO comprises increasing the maximum number for a high transmission bandwidth and decreasing the maximum number for a low transmission bandwidth. For example, if the bandwidth of a radio air interface deployed by access node 110 within sector 115 is 10 MHz or 15 MHz, then decreasing the number of MU-MIMO wireless devices may improve MU-MIMO gains. Conversely, if the bandwidth of the radio-air interface in sector 115 is 20 MHz or higher, then the number of MU-MIMO wireless devices (or MU-MIMO groups) may be increased without causing any detriment to MU-MIMO gains within the sector 115.

In another exemplary embodiment, the transmission characteristics can include channel state information reported by one or more of wireless devices 120, 130, 140. The channel state information may be based on (or may indicate) external interference caused to wireless devices 120, 130, 140 located within the sector 115 from an external source, such as other sectors or other wireless networks utilizing similar frequencies. In these embodiments, adjusting the maximum number of wireless devices participating in MU-MIMO comprises reducing the maximum number if the external interference rises above a threshold. For example, an upper or lower band of a frequency spectrum utilized by wireless devices 120, 130, 140, such as the top 35% and bottom 35% of frequencies, may be more likely to be affected by externally-induced interference. Thus, these portions of the spectrum may be monitored, and a number of MU-MIMO wireless devices or groups may be reduced if the interference in these portions rises to meet a threshold.

As further described herein, the method described above (and variants of said method) may be performed by any component(s) within system 100. For example, system 100 may include a processing node (not shown), and a processor coupled to the processing node. For example, the processing node may be communicatively coupled to access node 110, controller node 104, or any other network node. The processor can be configured to perform operations including monitoring one or more transmission characteristics associated with sector 115, and adjusting a maximum number of wireless devices participating in MU-MIMO based on the one or more signal conditions. The maximum number of wireless devices participating in MU-MIMO can include a maximum average number of wireless devices per MU-MIMO group, a maximum number of MU-MIMO groups, a maximum number of MU-MIMO wireless devices attached to the access node, an average number of MU-MIMO wireless devices per MU-MIMO group, and various combinations of these numbers. In this exemplary embodiment, the one or more transmission characteristics can include any of a MU-MIMO gain associated with MU-MIMO signals 135, 145, a noise level associated with one or more wireless devices 120, 130, 140, a channel bandwidth used within the sector 115, or an external interference experienced by the wireless devices 120, 130, 140. The MU-MIMO gain can be based on, for example, an average signal separation of MU-MIMO signals 135, 145, a size of the sector 115, an orthogonality of MU-MIMO eligible wireless devices 130, 140 an AoA associated with each of the MU-MIMO eligible wireless devices 130, 140 an aggregate throughput of the MU-MIMO signals 135, 145, or any combination of the above. The system 100 can be further configured to perform operations including determining a historical trend of the one or more transmission characteristics, and adjusting the maximum number in real-time based on the historical trend.

In another exemplary embodiment, the processing node within system 100 may be configured to perform operations including determining a historical trend of MU-MIMO gains within sector 115, measuring one or more signal characteristics of MU-MIMO signals 135, 145 and, based on a combination of the historical trend and the one or more signal characteristics, adjusting a maximum number of wireless devices located in the sector and eligible to participate in MU-MIMO. In this embodiment, the operations can further include increasing the maximum number upon determining that the historical trend indicates high MU-MIMO gains, and decreasing the maximum number upon determining that the historical trend indicates low MU-MIMO gains. Further, whether or not the signal characteristics reach optimal values can be a factor in determining when to increase or decrease the maximum number of MU-MIMO devices, as further described herein.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 120, 130, 140 may be any device, system, combination of devices, or other such communication platform capable of communicating wirelessly with access node 110 using one or more frequency bands deployed therefrom. Wireless devices 120, 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121, 122, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, Ti, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to historical load information and MU-MIMO gains experienced by access node 110 and wireless devices 120, 130, 140. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
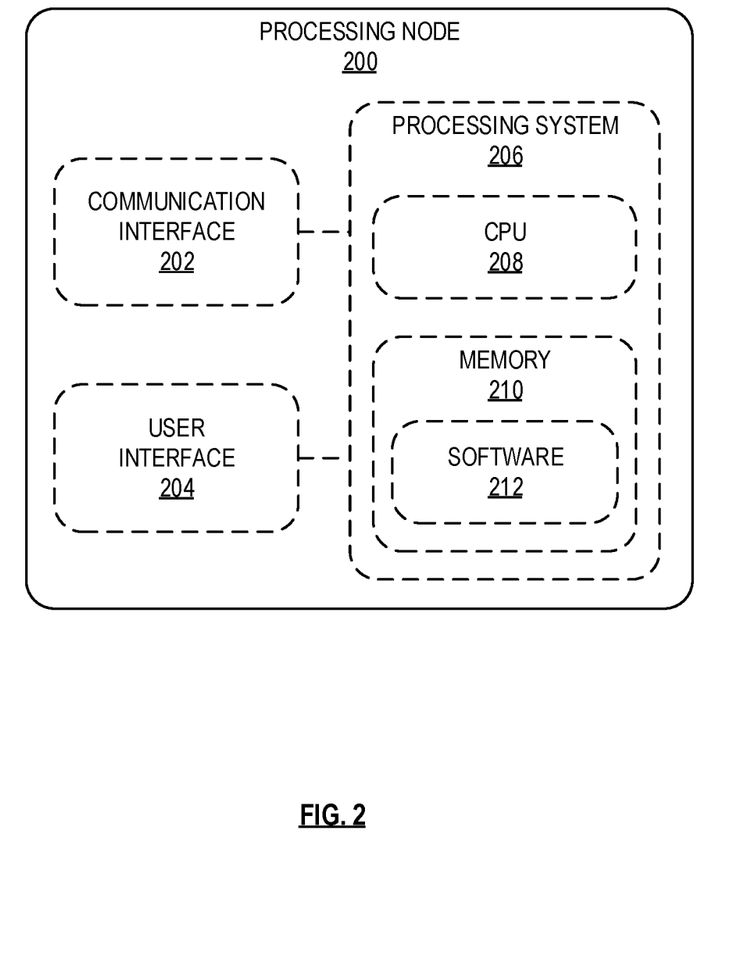
FIG. 2 depicts an exemplary processing node for performing MU-MIMO in a wireless network.

FIG. 2 depicts an exemplary processing node, comprising a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include logic for performing the operations described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
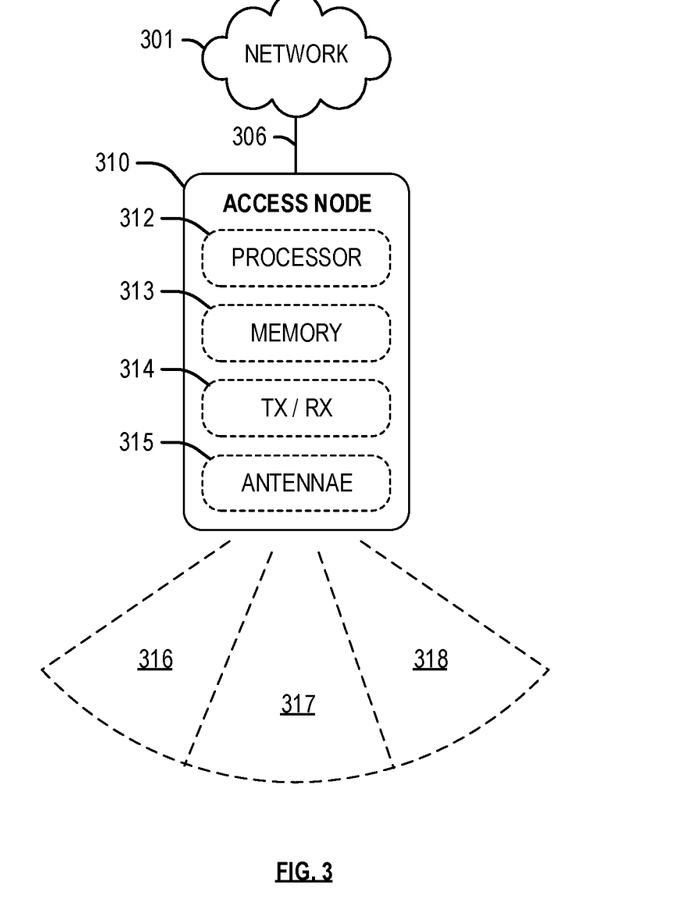
FIG. 3 depicts an exemplary access node for performing MU-MIMO in a wireless network.

FIG. 3 depicts an exemplary access node 310 for performing MU-MIMO in a wireless network. Access node 310 is configured as an access point for providing network services from network 301 to end-user wireless devices such as wireless devices 120, 130, 140 in FIG. 1. Access node 310 is illustrated as comprising a memory 313 for storing logical modules that perform operations described herein, a processor 312 for executing the logical modules, and a transceiver 314 for transmitting and receiving signals via antennae 315. Combination of antennae 315 and transceiver 314 are configured to deploy a radio air interface in one or more sectors 316, 317, 318. Further, in each sector, the antennae 315 may be configured to operate in various operating modes (or transmit data in various transmission mode), such as SU-MIMO, MU-MIMO, beamforming, etc. Similarly, transceivers 314 include a plurality of transceivers that can deploy MU-MIMO or massive MIMO data streams to end-user wireless devices in sectors 316, 317, 318, as well as to facilitate communication with other network nodes on network 301. Further, access node 310 is communicatively coupled to network 301 via communication interface 306, which may be any wired or wireless link as described above.

Figure 4:
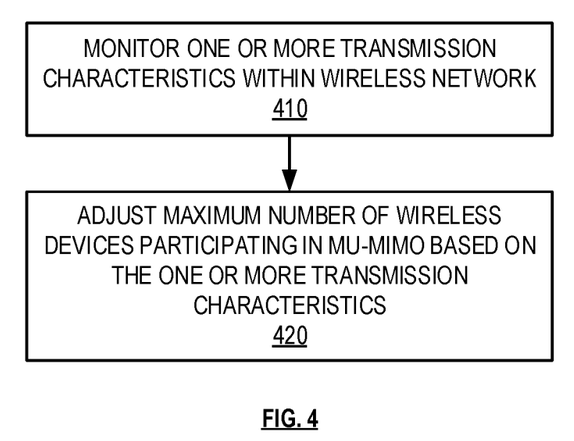
FIG. 4 depicts an exemplary method for adjusting a maximum number of wireless devices participating in MU-MIMO based on transmission characteristics.

FIG. 4 depicts an exemplary method for adjusting a maximum number of wireless devices participating in MU-MIMO based on transmission characteristics. The method of FIG. 4 is illustrated with respect to an access node, such as access node 110, 310, or a processing node, such as processing node 200. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, one or more transmission characteristics associated with the wireless network are monitored. The one or more transmission characteristics comprise signal characteristics of MU-MIMO signals within a sector of an access node in the wireless network. For example, the signal characteristics of the MU-MIMO signals comprise one or more of an average signal separation, a size of the sector, an orthogonality of MU-MIMO eligible wireless devices located in the sector, an angle of arrival of the MU-MIMO eligible wireless devices located in the sector, and a through-put of the MU-MIMO signals. The aggregate throughput may include a throughput of each of the one or more MU-MIMO groups in the sector, an average throughput of each MU-MIMO group or each wireless device in each MU-MIMO group, or an aggregate throughput (i.e. total throughput) of all MU-MIMO signals within the sector.

At 420, a maximum number of wireless devices participating in MU-MIMO is adjusted based on the one or more transmission characteristics. For example, a maximum number of wireless devices eligible to participate in MU-MIMO, or a maximum number of MU-MIMO groups, is increased or decreased depending on whether or not the transmission characteristics meet one or more thresholds. Adjusting the maximum number of wireless devices participating in MU-MIMO may include one or more of adjusting a maximum average number of wireless devices per MU-MIMO group, or a maximum number of MU-MIMO groups within the wireless network.

Figure 5:
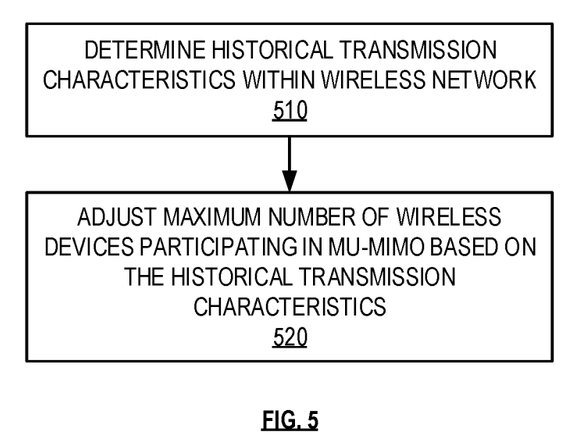
FIG. 5 depicts an exemplary method for adjusting a maximum number of wireless devices participating in MU-MIMO based on historical transmission characteristics.

FIG. 5 depicts an exemplary method for adjusting a maximum number of wireless devices participating in MU-MIMO based on historical transmission characteristics. The method of FIG. 5 is illustrated with respect to an access node, such as access node 110, 310, or a processing node, such as processing node 200. In other embodiments, the method can be implemented with any suitable network element. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, one or more transmission characteristics associated with the wireless network are monitored. As described with respect to the method of FIG. 4, the one or more transmission characteristics comprise signal characteristics of MU-MIMO signals within a sector of an access node in the wireless network. Further, a historical trend of the one or more transmission characteristics may be determined. For example, the historical signal characteristics of the MU-MIMO signals can include one or more of an average signal separation, a size of the sector, an orthogonality of MU-MIMO eligible wireless devices located in the sector, an angle of arrival of the MU-MIMO eligible wireless devices located in the sector, and a throughput of the MU-MIMO signals. The aggregate throughput may include a throughput of each of the one or more MU-MIMO groups in the sector, an average throughput of each MU-MIMO group or each wireless device in each MU-MIMO group, or an aggregate throughput (i.e. total throughput) of all MU-MIMO signals within the sector.

At 520, a maximum number of wireless devices participating in MU-MIMO is adjusted based on the one or more transmission characteristics. Adjusting the maximum number of wireless devices participating in MU-MIMO may include one or more of adjusting a maximum average number of wireless devices per MU-MIMO group, or a maximum number of MU-MIMO groups within the wireless network. Steps 510 and 520 can be performed repeatedly within a time period. The time period can be configurable, in that it can be adjusted by an operator of the wireless network, or by an automated feedback mechanism. For example, time intervals may be defined by the operator as every minute, every hour, etc. Thus, a maximum number of wireless devices eligible to participate in MU-MIMO, or a maximum number of MU-MIMO groups, is increased or decreased depending on whether or not a historical trend of transmission characteristics meet one or more thresholds as determined each time period.

Figure 6:
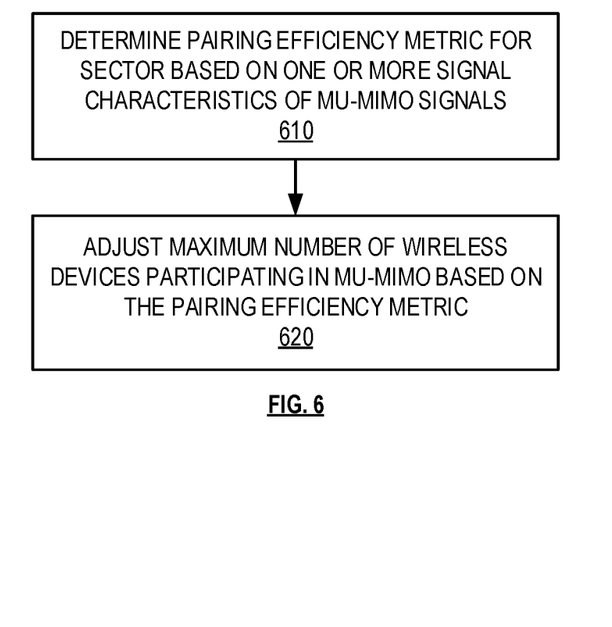
FIG. 6 depicts an exemplary method for adjusting a maximum number of wireless devices participating in MU-MIMO based on a pairing efficiency metric.

FIG. 6 depicts an exemplary method for adjusting a maximum number of wireless devices participating in MU-MIMO based on a pairing efficiency metric. The method of FIG. 6 is illustrated with respect to an access node, such as access node 110, 310, or a processing node, such as processing node 200. In other embodiments, the method can be implemented with any suitable network element. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, a pairing efficiency metric is determined for a sector of the wireless network based on one or more signal characteristics of MU-MIMO signals in the sector. In an exemplary embodiment, the pairing efficiency metric is based on whether or not maximum or optimal values of each signal characteristic are achieved. For example, the pairing efficiency metric may increase if the throughput increases, and if many wireless devices within the sector meet an orthogonality threshold. Further, a number of successful pairings may be considered in determining the pairing efficiency metric. The pairing efficiency metric may further be based on historical trends of the signal characteristics. For example, the historical trends may be monitored and recorded at time intervals, and the pairing efficiency metric based on the recorded historical trends. Thus, at certain time intervals, the pairing efficiency metric is monitored when adjusting the maximum number of MU-MIMO wireless devices.

At 620, the maximum number of wireless devices participating in MU-MIMO is adjusted based on the pairing efficiency metric. For example, the maximum number of wireless devices participating in MU-MIMO is raised or lowered such that the pairing efficiency metric is optimized, i.e. when optimal values of each signal characteristic are achieved. Adjusting the maximum number of wireless devices participating in MU-MIMO may include one or more of adjusting a maximum average number of wireless devices per MU-MIMO group, or a maximum number of MU-MIMO groups within the wireless network. Steps 610 and 620 can be performed repeatedly within a time period. The time period can be configurable, in that it can be adjusted by an operator of the wireless network, or by an automated feedback mechanism. For example, time intervals may be defined by the operator as every minute, every hour, etc. Thus, a maximum number of wireless devices eligible to participate in MU-MIMO, or a maximum number of MU-MIMO groups, is increased or decreased depending on whether or not a historical pairing efficiency metric meets one or more thresholds as determined each time period.

Figure 7:
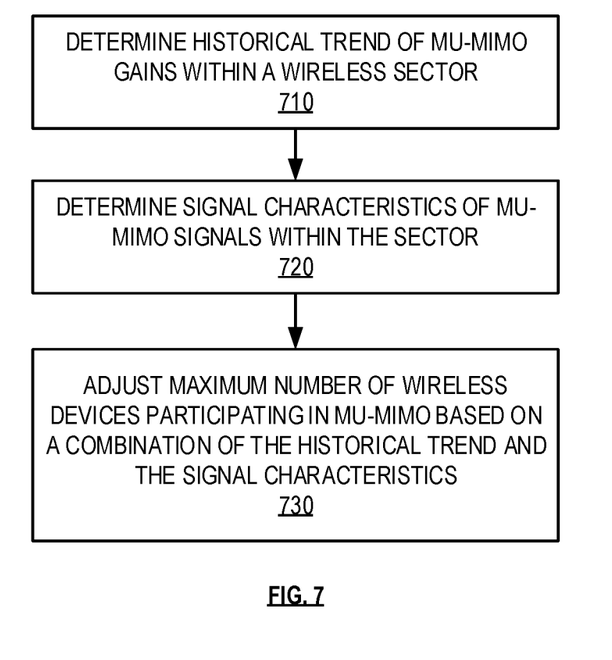
FIG. 7 depicts an exemplary method for adjusting a maximum number of wireless devices participating in MU-MIMO based on a combination of historical MU-MIMO gains and signal characteristics.

FIG. 7 depicts an exemplary method for adjusting a maximum number of wireless devices participating in MU-MIMO based on a combination of historical MU-MIMO gains and signal characteristics. The method of FIG. 7 is illustrated with respect to an access node, such as access node 110, 310, or a processing node, such as processing node 200. In other embodiments, the method can be implemented with any suitable network element. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, a historical trend of MU-MIMO gains is determined for a wireless sector. The MU-MIMO gain can be based on, for example, an average signal separation, a size of the sector, an orthogonality of MU-MIMO eligible wireless devices located in the sector, an angle of arrival of the MU-MIMO eligible wireless devices located in the sector, an aggregate throughput of the MU-MIMO signals, or any combination of the above. The gains may further be based on a historical trend of each of these signal characteristics, as well as historic trends in the gains themselves. and adjusting the maximum number in real-time based on the historical trend.

At 720, signal characteristics are determined for MU-MIMO signals operating within the sector. For example, the signal characteristics can include one or more of an average signal separation, a size of the sector, an orthogonality of MU-MIMO eligible wireless devices located in the sector, an angle of arrival of the MU-MIMO eligible wireless devices located in the sector, and a throughput of the MU-MIMO signals.

At 730, based on a combination of the historical trend and the one or more signal characteristics, a maximum number of wireless devices located in the sector and eligible to participate in MU-MIMO is adjusted. For example, the maximum number is increased upon determining that the historical trend indicates high MU-MIMO gains, and decreased upon determining that the historical trend indicates low MU-MIMO gains. Further, whether or not the signal characteristics reach optimal values can be a factor in determining when to increase or decrease the maximum number of MU-MIMO devices, as further described herein.

Figure 8:
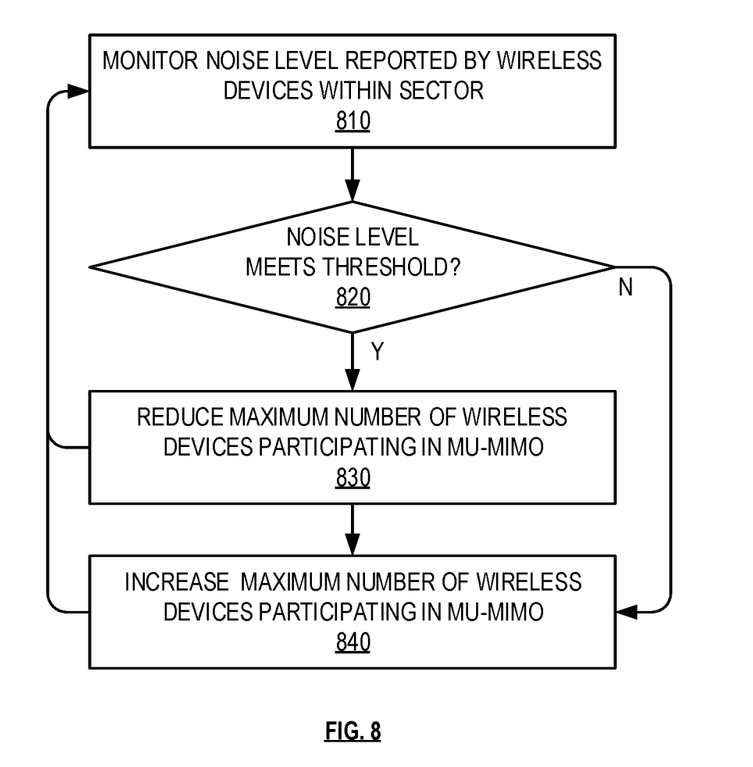
FIG. 8 depicts an exemplary method for adjusting a maximum number of wireless devices participating in MU-MIMO based on a noise level.

FIG. 8 depicts an exemplary method for adjusting a maximum number of wireless devices participating in MU-MIMO based on a noise level. The method of FIG. 8 is illustrated with respect to an access node, such as access node 110, 310, or a processing node, such as processing node 200. In other embodiments, the method can be implemented with any suitable network element. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, a noise level is monitored based on reports from wireless devices operating within a sector. The noise levels may be associated with one or more existing MU-MIMO groups in the sector. At 820, the noise level is compared with a threshold, and the maximum number of wireless devices participating in MU-MIMO in the sector is reduced or increased based on the determination. For example, as MU-MIMO pairings (or groups) increase, a signal to interference plus noise ratio (SINR) may be reduced at 820. Thus, when a SINR is measured at below a threshold, a maximum number of MU-MIMO groups may be reduced at 830. Further, when the SINR is measured above the threshold, a maximum number of MU-MIMO groups may be increased at 840. The SINR may be based on measurements at specific locations within a sector, and locations having a historical trend of a low SINR may be monitored and MU-MIMO group maximum limits applied therein. In addition, the noise levels may be based on a throughput of the sector or of MU-MIMO groups within the sector.

Figure 9:
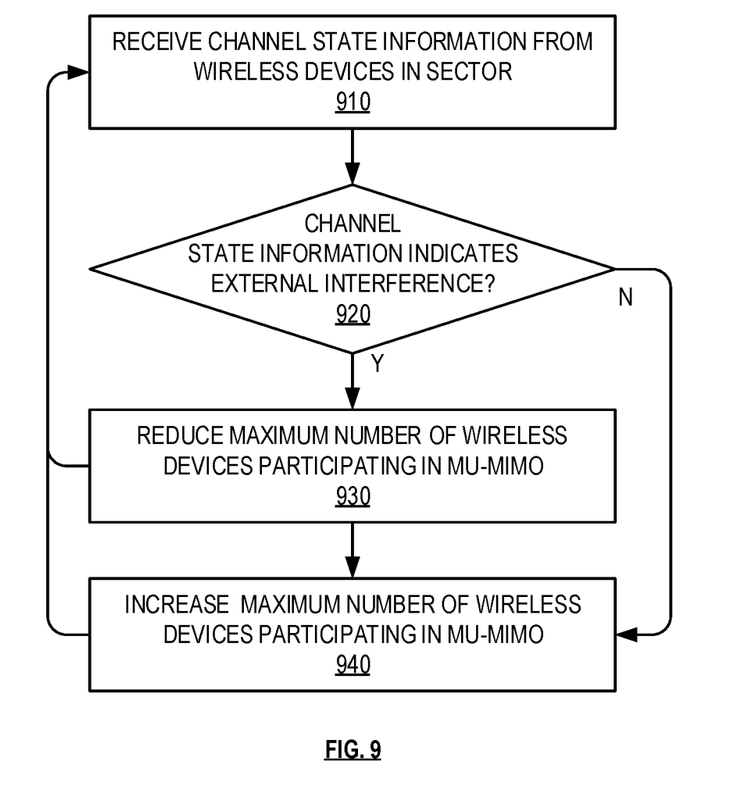
FIG. 9 depicts an exemplary method for adjusting a maximum number of wireless devices participating in MU-MIMO based on channel state information.

FIG. 9 depicts an exemplary method for adjusting a maximum number of wireless devices participating in MU-MIMO based on channel state information. The method of FIG. 9 is illustrated with respect to an access node, such as access node 110, 310, or a processing node, such as processing node 200. In other embodiments, the method can be implemented with any suitable network element. Although FIG. 9 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 910, a channel state information (CSI) is received from wireless devices operating within a sector. The CSI may be received from wireless devices in one or more existing MU-MIMO groups in the sector, and may be based on (or may indicate) external interference caused to wireless devices located within the sector from an external source, such as other sectors or other wireless networks utilizing similar frequencies. At 920, it is determined whether or not the CSI indicates external interference. If yes, a maximum number of MU-MIMO groups may be reduced at 930. For example, an upper or lower band of a frequency spectrum, such as the top 35% and bottom 35% of frequencies, may be more likely to be affected by externally-induced interference. Thus, these portions of the spectrum may be monitored, and a maximum number of MU-MIMO wireless devices or groups may be reduced if the interference in these portions rises to meet a threshold. Conversely, if the CSI does not indicate external interference, or low external interference, then the maximum number of MU-MIMO wireless devices or groups may be increased at 940.

Figure 10:
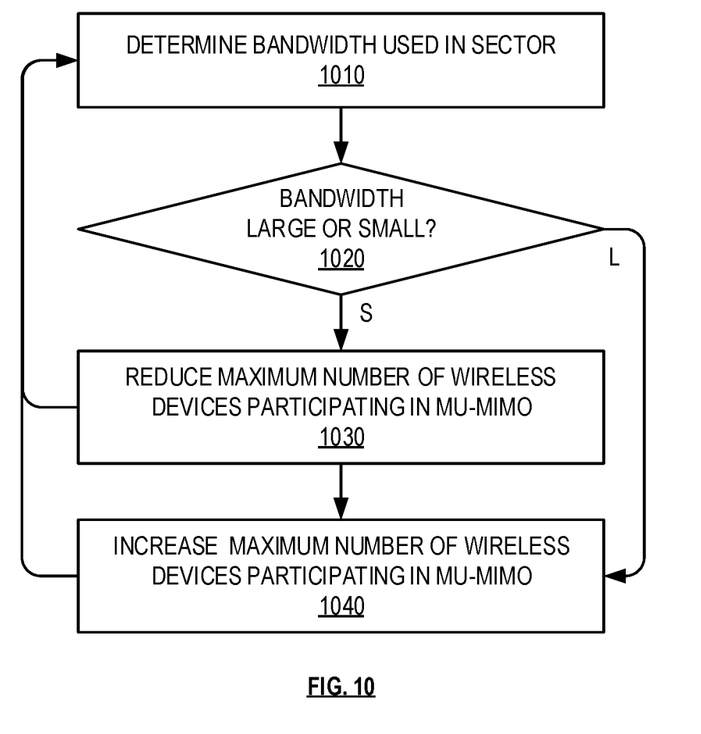
FIG. 10 depicts an exemplary method for adjusting a maximum number of wireless devices participating in MU-MIMO based on a channel bandwidth.

FIG. 10 depicts an exemplary method for adjusting a maximum number of wireless devices participating in MU-MIMO based on a channel bandwidth. The method of FIG. 10 is illustrated with respect to an access node, such as access node 110, 310, or a processing node, such as processing node 200. In other embodiments, the method can be implemented with any suitable network element. Although FIG. 10 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 1010, a transmission bandwidth associated with the sector is determined or identified and at 1020, it is determined whether or not the transmission bandwidth is large or small, with the terms large or small being defined by an operator of the network. For example, if the bandwidth is 10 MHz or 15 MHz, then decreasing the number of MU-MIMO wireless devices may improve MU-MIMO gains, and the maximum number is reduced at 1030. Conversely, if the bandwidth is 20 MHz or higher, then the number of MU-MIMO wireless devices (or MU-MIMO groups) may be increased without causing any detriment to MU-MIMO gains within the sector, and the maximum number is increased at 1040.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for performing multi-user multiple-input-multiple-output (MU-MIMO) in a wireless network, the method comprising:
    monitoring one or more transmission characteristics associated with the wireless network, wherein the one or more transmission characteristics comprise at least noise levels associated with one or more existing MU-MIMO groups within a sector of an access node in the wireless network;
    determining a pairing efficiency metric of the sector based at least on the noise levels, wherein the pairing efficiency metric comprises a number representing a plurality of MU-MIMO groups exhibiting a noise level below a predetermined threshold;
    monitoring the pairing efficiency metric at predetermined time intervals; and
    adjusting a maximum number of wireless devices within the sector eligible to participate in MU-MIMO at the predetermined time intervals based at least on the noise levels such that the pairing efficiency metric is optimized,
    wherein the maximum number of wireless devices within the sector eligible to participate in MU-MIMO further comprises one or both of a maximum average number of wireless devices per MU-MIMO group or a maximum number of MU-MIMO groups.

2. The method of claim 1, wherein the one or more transmission characteristics of the MU-MIMO signals comprise one or more of an average signal separation, a size of the sector, an orthogonality of MU-MIMO eligible wireless devices located in the sector, an angle of arrival of the MU-MIMO eligible wireless devices located in the sector, and a throughput of the MU-MIMO signals.

3. The method of claim 1, wherein the pairing efficiency metric is further based on historical trends of the transmission characteristics.

4. The method of claim 1, further comprising:
    determining that the noise levels exceed the predetermined threshold; and reducing the maximum number of wireless devices eligible to participate in MU-MIMO in the sector.

5. The method of claim 1, wherein the noise levels are based on a measured signal to interference plus noise ratio (SINR).

6. The method of claim 1, wherein the noise levels are based on a measured throughput.

7. The method of claim 1, wherein the one or more transmission characteristics comprise a transmission bandwidth associated with the sector.

8. The method of claim 7, wherein adjusting the maximum number of wireless devices participating in MU-MIMO comprises increasing the maximum number for a high transmission bandwidth and decreasing the maximum number for a low transmission bandwidth.

9. The method of claim 1, wherein the one or more transmission characteristics comprise channel state information.

10. The method of claim 9, wherein the channel state information is based on external interference caused to wireless devices located within the sector from an external source.

11. The method of claim 10, wherein adjusting the maximum number of wireless devices eligible to participate in MU-MIMO comprises reducing the maximum number if the external interference rises above a threshold.

12. A system for performing multi-user multiple-input-multiple-output (MU-MIMO) in a wireless network, the system comprising:
   a processing node; and
   a processor coupled to the processing node, the processor being configured to perform operations comprising:
      monitoring one or more transmission characteristics associated with a sector in the wireless network, wherein the one or more transmission characteristics comprise at least noise levels associated with one or more existing MU-MIMO groups within a sector of an access node in the wireless network;
      determining a pairing efficiency metric of the sector based at least on the noise levels, wherein the pairing efficiency metric comprises a number representing a plurality of MU-MIMO groups exhibiting a noise level below a predetermined threshold;
      monitoring the pairing efficiency metric at predetermined time intervals; and
      adjusting a maximum number of wireless devices within the sector eligible to participate in MU-MIMO at the predetermined time intervals based at least on the noise levels such that the pairing efficiency metric is optimized,
      wherein the maximum number of wireless devices participating in MU-MIMO further comprises one or both of a maximum average number of wireless devices per MU-MIMO group or a maximum number of MU-MIMO groups.

13. The system of claim 12, wherein the one or more transmission characteristics additionally comprise one or more of: a MU-MIMO gain associated with one or more MU-MIMO groups within the sector, a channel bandwidth used within the sector, or an external interference experienced by the wireless devices in the sector.

14. The system of claim 13, wherein the MU-MIMO gain is based on one or more of an average signal separation, a size of the sector, an orthogonality of MU-MIMO eligible wireless devices located in the sector, an angle of arrival of the MU-MIMO eligible wireless devices located in the sector, and an aggregate throughput.

15. The system of claim 13, wherein the operations further comprise:
   determining a historical trend of the one or more transmission characteristics; and
   adjusting the maximum number in real-time based on the historical trend.

16. A processing node for performing multi-user multiple-input-multiple-output (MU-MIMO) in a wireless network, the processing node being configured to perform operations comprising:
   determining a historical trend of MU-MIMO gains within a sector of the wireless network;
   measuring one or more signal characteristics comprising at least noise levels of MU-MIMO signals within the sector;
   determining a pairing efficiency metric of the sector based on the noise levels, wherein the pairing efficiency metric comprises a number representing a plurality of MU-MIMO groups exhibiting a noise level below a predetermined threshold;
   monitoring the pairing efficiency metric at predetermined time intervals; and
   based on a combination of the historical trend and the noise levels, adjusting a maximum number of wireless devices located in the sector eligible to participate in MU-MIMO at the predetermined time intervals such that the pairing efficiency metric is optimized.

17. The processing node of claim 16, wherein the operations further comprise:
   increasing the maximum number upon determining that the historical trend indicates high MU-MIMO gains; and
   decreasing the maximum number upon determining that the historical trend indicates low MU-MIMO gains.

* * * * *